US010356368B2

(12) United States Patent
Vourkoutiotis

(10) Patent No.: US 10,356,368 B2
(45) Date of Patent: Jul. 16, 2019

(54) METHOD OF VIDEO SURVEILLANCE USING CELLULAR COMMUNICATION

(71) Applicant: Alexandros John Vourkoutiotis, Hamilton (CA)

(72) Inventor: Alexandros John Vourkoutiotis, Hamilton (CA)

(*) Notice: Subject to any disclaimer, the term of this patent is extended or adjusted under 35 U.S.C. 154(b) by 403 days.

(21) Appl. No.: 14/822,174

(22) Filed: Aug. 10, 2015

(65) Prior Publication Data
US 2016/0044283 A1 Feb. 11, 2016

Related U.S. Application Data

(60) Provisional application No. 62/035,753, filed on Aug. 11, 2014.

(51) Int. Cl.
G06F 15/16 (2006.01)
H04N 7/18 (2006.01)
H04W 4/00 (2018.01)
G08B 13/196 (2006.01)
G08B 25/08 (2006.01)

(52) U.S. Cl.
CPC ....... H04N 7/181 (2013.01); G08B 13/19667 (2013.01); G08B 25/08 (2013.01); H04W 4/00 (2013.01)

(58) Field of Classification Search
CPC ... H04N 7/181; H04W 4/00; G08B 13/19667; G08B 25/08
USPC ........ 709/249, 217, 219, 228, 203; 370/401, 370/255, 252; 348/143, 207.1, 61, 158
See application file for complete search history.

(56) References Cited

U.S. PATENT DOCUMENTS

| 2006/0193319 | A1* | 8/2006 | Sung | H04L 29/06027 370/389 |
| 2007/0214232 | A1* | 9/2007 | Belimpasakis | H04L 12/2818 709/217 |
| 2007/0255809 | A1* | 11/2007 | Chiba | H04L 67/025 709/219 |
| 2009/0323556 | A1* | 12/2009 | Liu | H04L 29/12301 370/255 |
| 2010/0033573 | A1* | 2/2010 | Malinovski | G08B 13/19656 348/158 |
| 2010/0214398 | A1* | 8/2010 | Goulart | H04N 21/2387 348/61 |
| 2010/0246669 | A1* | 9/2010 | Harel | G06F 11/1004 375/240.02 |

(Continued)

Primary Examiner — Thuong Nguyen
(74) Attorney, Agent, or Firm — Ridout & Maybee LLP

(57) ABSTRACT

A method of video surveillance with a mobile station using cellular communication including the steps of: a) applying power to a mobile station which includes a router in communication with a wireless transceiver for transmitting data wirelessly; b) the router in communication with an private network in the mobile station; c) the private network in communication with surveillance devices attached to the mobile station; d) the router in communication with a private APN via the wireless transceiver over a cellular network and the mobile internet to a monitoring center; and e) the monitoring center receiving wireless surveillance data from the surveillance devices and transmitting control data wirelessly to the devices such that surveillance monitoring and device control is completed wirelessly over a series of networks.

16 Claims, 6 Drawing Sheets

(56) References Cited

U.S. PATENT DOCUMENTS

| | | | |
|---|---|---|---|
| 2011/0289228 A1* | 11/2011 | Chen | H04L 67/025 709/228 |
| 2011/0292207 A1* | 12/2011 | Bae | H04N 7/181 348/143 |
| 2011/0314159 A1* | 12/2011 | Murphy | H04L 65/4076 709/226 |
| 2015/0074296 A1* | 3/2015 | Eidelman | G06F 13/10 710/8 |
| 2015/0350044 A1* | 12/2015 | Thomassian | H04L 61/1511 370/252 |
| 2016/0011618 A1* | 1/2016 | Janous | G05B 15/02 700/291 |
| 2016/0105847 A1* | 4/2016 | Smith | H04L 67/125 370/252 |

* cited by examiner

METHOD OF VIDEO SURVEILLANCE USING CELLULAR COMMUNICATION

FIELD OF THE INVENTION

The present concept relates to video surveillance and more particularly relates to video surveillance using cellular communication networks.

BACKGROUND OF THE INVENTION

Remote monitoring has shown to be a cost effective and capable means of securing physical locations. Current generation remote monitoring is conducted by remotely accessing existing wired camera systems and having the required software in a central location in order to view the cameras based on their communications type.

This has several drawbacks in that multiple software types are required at the central location to monitor multiple sites and consequently monitoring staff must be trained in multiple software types in order effectively control the systems.

Introducing further complications, video surveillance is typically, at least in part, transmitted over large bandwidth wired internet connections which necessitate internet availability at each site where monitoring is to occur. Once internet connectivity has been established it is then possible to broadcast the video streams back to a central office. As such, the camera locations are heavily affected by the limitations of the internet accessibility.

Where internet accessibility is difficult, costly, or impossible the current solution is to use ubiquity antennas.

Ubiquity antennas allow use of cameras in areas where internet is not available but require a clear line of sight, and all camera units to transmit to a central unit that is connected to a wired internet connection.

Inclement weather and blockages to the line of sight can severely impair the ability of Ubiquity antennas to communicate—damaging reliability of the overall system. Further, having all units communicate with one wired connection introduces the possibility that intermittent internet outages on the single wired connection will cause the entire site to be experience intermittent outages.

Aside from the technical limitation of these systems, the existing systems typically work best for installations which are static and are not moving from one location to the other. In circumstances where the surveillance area is constantly changing or moving to different sites these static installations become very expensive to install, uninstall, and then reinstall into the new location.

Cellular communication has been used in order to bypass the need for ubiquity antennaes, however, there are limitations in the way information is routed.

Modern cellular connections require information to be routed using sim cards with identifiable phone numbers attached. Routing information occurs once the cellular router has been given permission by the service provider to exist on the network and the cellular phone number is given permission to communication with the APN (Access Point Name server) at this point the APN will translate the cellular phone number into an I.P. address that can communicate on the internet.

Cellular routers are given private I.P. addresses from the service provider and are only able to route information through a specific set of protocols and ports. All protocols and ports outside the permissible spectrum are blocked by the service provider for internal use. As such, this blocking and routing method create limitations on how data can be transmitted over a cellular network, and requires security camera systems that are specifically designed to communicate on cellular networks.

Even where a system works around the limitations of the cellular network, bandwidth throughput is typically throttled such that serving of video streams is limited to shorter clips as opposed to live streaming around the clock. Cost of Bandwidth limits the ability of a company to monitor a location in real-time (live) due to the inherit bandwidth consumed on a monthly basis in order to monitoring a high-resolution video feed.

It is also worthwhile to note that sites lacking Internet may also lack electrical power. Availability of power is necessary in order to provide units in remote areas or areas under development for the purpose of remote monitoring. If power is not available, implementation may not be possible as current setups typically require larger amounts of power in order to provide effective monitoring.

In Summary, the approaches being offered on the market today rely heavily on a patchwork quasi-network of cameras and software traditionally having a steep learning curve. Further these systems provide minimal redundancy and do not allow end users (clients) any substantial control or input into the monitoring process.

Therefore there is a need for a video surveillance method which is portable in nature, allowing for monitoring using uniform software, which can utilize cellular communication networks in order to transmit the necessary data, and provide a client with access to the monitoring process. There is also a need for this system to utilize minimal electrical power and function in areas without reliable power.

SUMMARY OF THE INVENTION

There is a common consensus in the industry that Remote Live Monitoring must be made more intuitive and streamlined then what is currently being offered, particularly to provide a more user friendly environment for end users. These and other needs are addressed by the present invention that provides a repeatable and standardized method of providing remote monitoring systems that require ultra-low power. The invention also addresses the complex environment of remote monitoring and condenses it through automation in order to provide a very easy to use interface that can be configured both locally and remotely.

A method of video surveillance with a mobile station using cellular communication including the steps of a) applying power to a mobile station which includes a router in communication with a wireless transceiver for transmitting data wirelessly; b) the router in communication with an private network in the mobile station; c) the private network in communication with surveillance devices attached to the mobile station; d) the router in communication with a private APN via the wireless transceiver over a cellular network and the mobile internet to a monitoring center; and e) the monitoring center receiving wireless surveillance data from the surveillance devices and transmitting control data wirelessly to the devices such that surveillance monitoring and device control is completed wirelessly over a series of networks.

Preferably including the step of the monitoring center receiving video from multiple mobile stations and compiling data from each site, wherein each site is associated with a client and data from all of the clients sites are stored into a clients data file for subsequent on demand output to the client.

Preferably wherein the private network includes a NVR with an internal switch and software in communication with the surveillance devices and an internal storage device.

Preferably wherein the surveillance devices include predetermined MAC addresses, and the software recognizes a preselected identifying port address as corresponding to each surveillance device dependant on the characteristics of that device.

Preferably wherein the devices are selected from among video cameras, PZT's, memory, lights, and sounding device.

Preferably wherein the monitoring center selectively sends commands over a cellular network to a selected mobile station chosen from among: vary resolution of video transmitted to monitoring center, and pan or tilt camera, and trigger an alarm, and trigger a light, and initiate two way voice messaging, and adjusting predetermined analytical parameters.

Preferably wherein the mobile station records statistical information chosen from among: object recognition, and facial recognition, and line crossing, and region enter and exit, and object removal, and person counting, and traffic statistics, and time lapse photography.

Preferably wherein the mobile station is powered in part by solar energy or fully by solar energy.

Preferably wherein the mobile station continuously monitors and record analytic data which is based on a set of predetermined analytical parameters which may trigger an exception; the exceptions are selected from among a line crossing, a region encroachment, an object removal, and a facial recognition.

Preferably wherein the mobile station configures the data transmission over the cellular network such that less than 10 gigabytes of data are consumed for 432 hours of surveillance time with three video cameras continuously operating.

Preferably wherein the APN configured to allow unrestricted flow of data including no data throttling, and no blocked ports.

Preferably wherein the APN allows the router to reset the time to live for each data packet leaving the router to the maximum.

Preferably wherein a client's request for duplicate wireless surveillance data will be served from the clients data file.

Preferably wherein the data from the surveillance devices is transmitted through the private network and recorded and stored onto the internal storage at the highest resolution.

Preferably wherein the data from the surveillance device is stored internally at the highest resolution possible and transmitted over the cellular network at reduced resolution.

A method of video surveillance with a mobile station using cellular communication including the steps of: a) applying power to a mobile station which includes a router in communication with a wireless transceiver for transmitting data wirelessly; b) the router in communication with an private network in the mobile station; c) the private network in communication with surveillance devices attached to the mobile station; d) the router in communication with a private APN via the wireless transceiver over a cellular network and the wired internet to a monitoring center; e) the monitoring center receiving wirelessly surveillance data from the surveillance devices and transmitting control data wirelessly to the devices such that surveillance monitoring and device control is completed wirelessly over a series of networks.

A method of video surveillance using cellular communication including the steps of: a) collect video images with an IP camera image using the following protocols namely ONVIF, PSIA and CGI; b) transfer data from the camera to the IP Switch using TCP/UDP internet protocol where it is then transferred from the switch to the Passive NVR and through the cellular modem at a preselected resolution; c) data sent from the switch to the NVR is set on a record schedule for local data retention and alarm inputs; d) outputs are controlled by the NVR; e) as alarms are triggered by machine analytics applied to the video imaging; f) data is transmitted via a cellular modem using TCP/IP protocol using preselected rules associated with the equipment that is being used; and g) the cellular modem is programmed to forward ports on the incoming WAN port to the respective IP Camera using the Port range of 8000-9000.

A method of video surveillance with a mobile station using cellular communication including the steps of: a) applying power to a mobile station; b) configuring surveillance devices attached to the mobile station with preprogrammed software residing within the mobile station; c) creating an internal network by assigning a private IP address to a NVR with an internal switch connected to the devices, each device being assigned a port, a MAC and an internal IP address, such that each surveillance device can send and receive data to a router, wherein the router has a public IP address and sends and receives data from the internet to each of the surveillance devices; wherein the devices are selected from among video cameras, PZT's, memory, lights, and sounding device; d) the router contacts a private APN which assigns a public IP address to the router thereby establishing an internet connection over a cellular network; e) a recording device within the mobile station records high definition high definition video from the devices; f) continuously monitor and record analytic data which is based on a set of predetermined analytical parameters which trigger exceptions; the exceptions are selected from among a line crossing, a region encroachment, an object removal, and a facial recognition; g) output video data across a cellular network, wherein the video image resolution is remotely selectable, additionally output analytic data is based on preselected conditions; h) monitoring center receives data for internal monitoring, and also forwards to client on demand; i) monitoring center receives video from each mobile station and compiles data from each site, each site is associated with a client and data from all of the clients sites are stored into a client's data file for subsequent on demand output to the client; j) monitoring center selectively sends commands to mobile station to selectively vary resolution of video transmitted to Monitoring Center, and to selectively pan or tilt a camera, and to selectively trigger an alarm and light; and k) the monitoring center stores and serves video to unique server locations associated with a client and monitoring center processes commands from clients for data transfer requirements

BRIEF DESCRIPTION OF THE DRAWINGS

The present concept will now be described by way of example only with reference to the following figures in which.

DEFINITIONS

Figure 1:
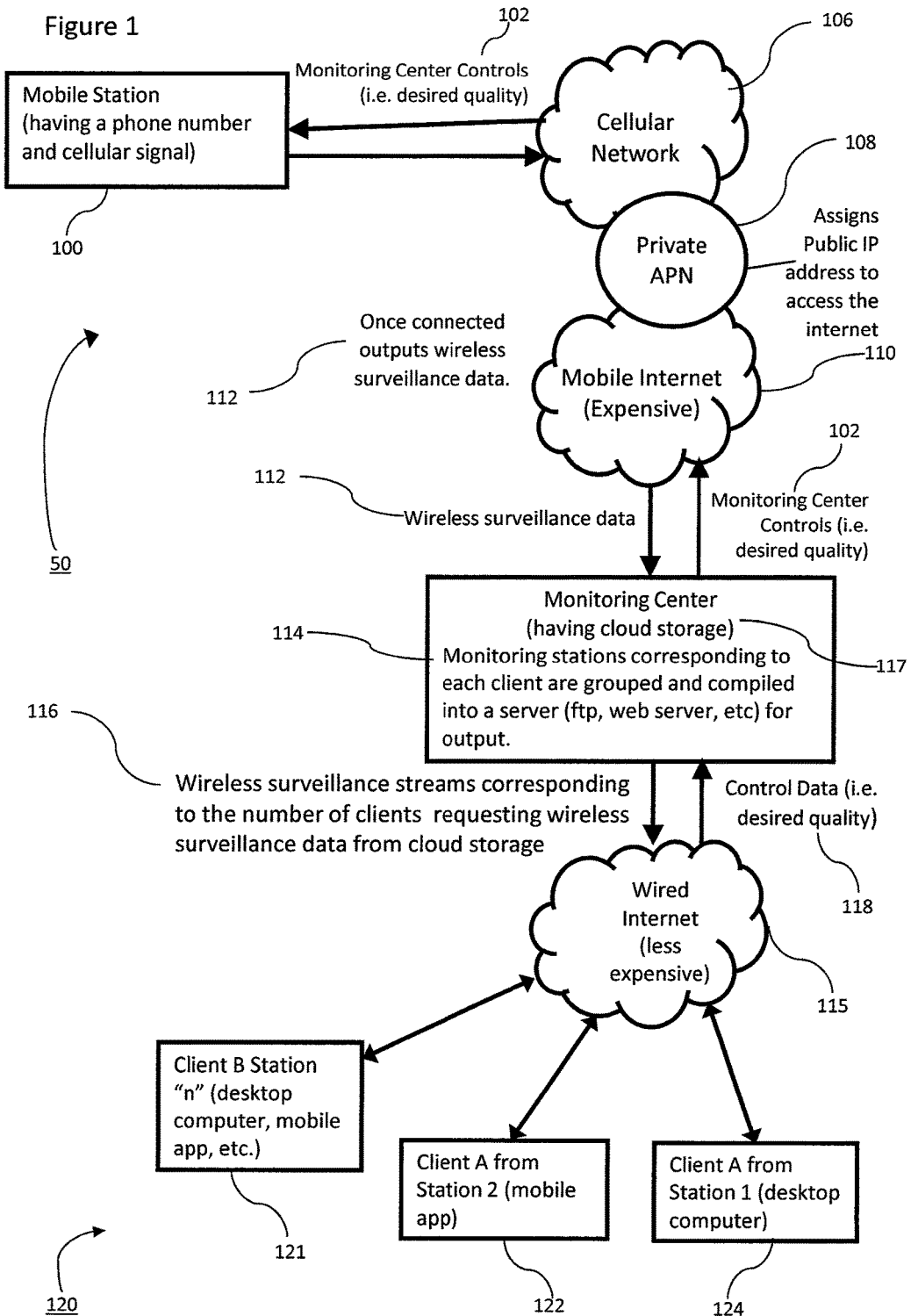
FIG. 1 is a flow diagram showing the method of video surveillance using cellular communication; specifically, the flow of data outside each mobile station.

ONVIF (Open Network Video Interface Forum)—a global and open industry forum with the goal to facilitate the development and use of a global open standard for the interface of physical IP-based security products. Or in other words, to create a standard for how IP products within video surveillance and other physical security areas can communicate with each other.

PSIA (Physical Security Interoperability Alliance)—a global consortium of more than 65 physical security manufacturers and systems integrators focused on promoting interoperability of IP-enabled security devices and systems across the physical security ecosystem as well as enterprise and building automation systems.

CGI
  Computer-generated imagery, computer graphic effects in films, television programs, and other visual media (CGI animation)
  Computer Graphics Interface, the low-level interface between the Graphical Kernel System (GKS) and the hardware.

TCP/UDP
  Transmission Control Protocol (TCP) is one of the core protocols of the Internet protocol suite (IP), and is so common that the entire suite is often called TCP/IP. TCP provides reliable, ordered and error-checked delivery of a stream of octets between programs running on computers connected to a local area network, intranet or the public Internet.
  The User Datagram Protocol (UDP) is one of the core members of the Internet protocol suite (the set of network protocols used for the Internet). With UDP, computer applications can send messages, in this case referred to as datagrams, to other hosts on an Internet Protocol (IP) network without prior communications to set up special transmission channels or data paths NVR (network video recorder) is a software program that records video in a digital format to a disk drive, USB flash drive, SD memory card or other mass storage device. An NVR contains no dedicated video capture hardware. However, the software is typically run on a dedicated device, usually with an embedded operating system.

WAN (wide area network) is a network that covers a broad area (i.e., any telecommunications network that links across metropolitan, regional, national or international boundaries) using leased telecommunication lines.

TC/IP in computer science and in Information and communications technology, the Internet protocol suite is the computer networking model and communications protocols used by the Internet and similar computer networks. It is commonly known as TCP/IP, because its most important protocols, the Transmission Control Protocol (TCP) and the Internet Protocol (IP), were the first networking protocols defined in this standard.

POE (Power over Ethernet) describes any of several standardized or ad-hoc systems which pass electrical power along with data on Ethernet cabling. This allows a single cable to provide both data connection and electrical power to devices such as wireless access points or IP cameras.

IP camera (Internet protocol camera), is a type of digital video camera commonly employed for surveillance, and which unlike analog closed circuit television (CCTV) cameras can send and receive data via a computer network and the Internet. Although most cameras that do this are webcams, the term "IP camera" or "netcam" is usually applied only to those used for surveillance.
  Centralized IP cameras, which require a central Network Video Recorder (NVR) to handle the recording, video and alarm management.
  Decentralized IP cameras, which do not require a central Network Video Recorder (NVR), as the cameras have recording function built-in and can thus record directly to any standard storage media, such as SD cards, NAS (network attached storage) or a PC/Server.

Main stream: designed to provide a full bandwidth feed at maximum fidelity to the monitoring center for when an incident has been detected by either the system or our monitoring staff.

Sub-stream: for standard patrol monitoring where high bandwidth is un-necessary. By utilizing a sub-stream we are able to monitor 24 hours a day without exceeding monthly bandwidth limitations.

DETAILED DESCRIPTION OF THE PREFERRED EMBODIMENT

The present concept is schematically represented in FIGS. 1 to 6.

Figure 2:
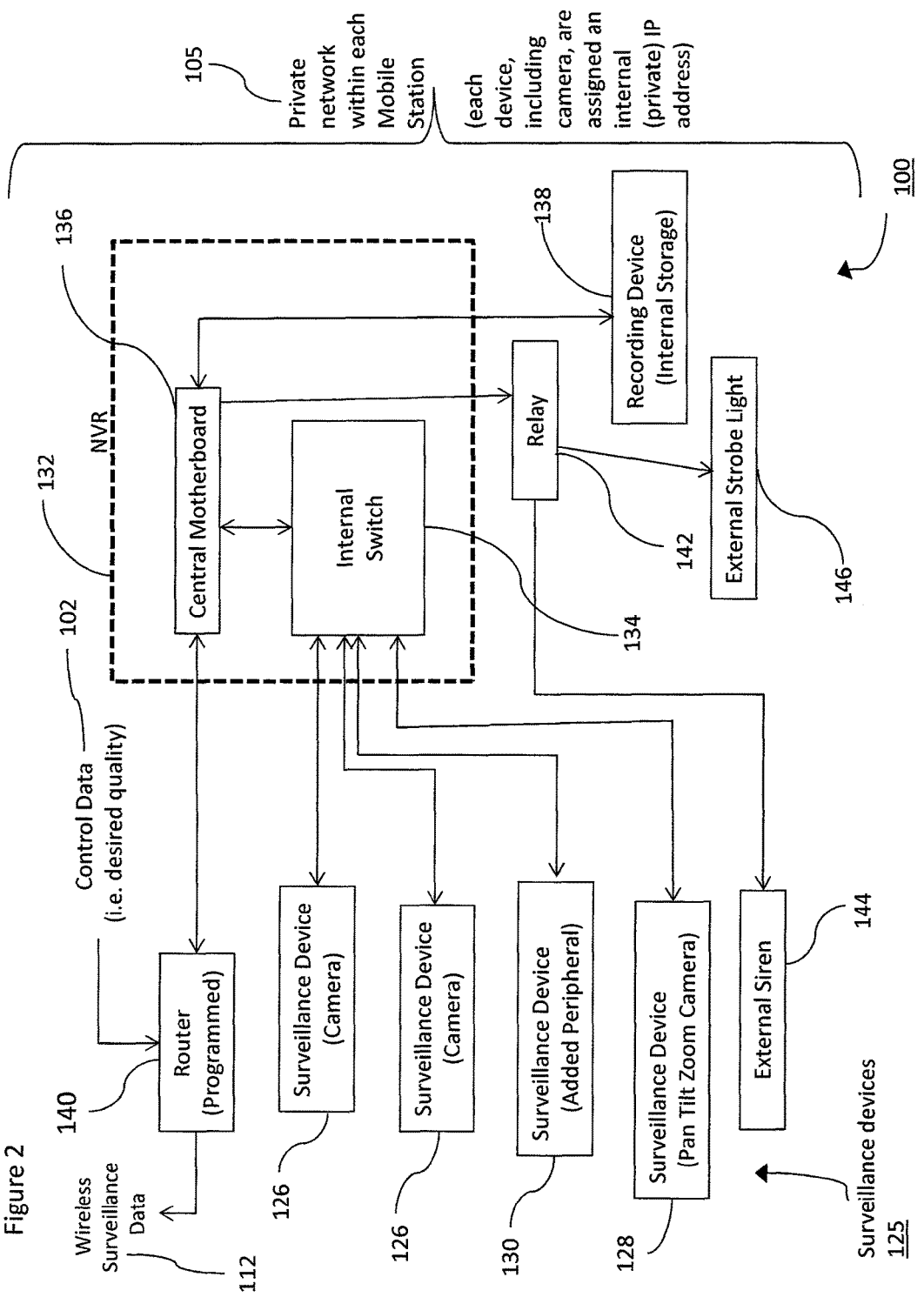
FIG. 2 is a flow diagram showing method of video surveillance using cellular communications; specifically, the flow of data inside each mobile station.

Referring to FIG. 1 and FIG. 2 which show a methodology for video surveillance using cellular communications referred to generally as 50.

FIG. 1 shows the flow of data outside a mobile station 100; whereas, FIG. 2 show shows the flow of data inside a mobile station 100.

The method of video surveillance with a mobile station using cellular communication 50 includes at least one mobile station 100, a cellular network 106, a private APN 108, a monitoring center 114 having cloud storage 117, and client stations shown generally as 120.

The mobile station 100 includes a programmed router 140 in communication with a private network 105 further comprising: a NVR 132 having an internal switch 134 and a central motherboard 136, surveillance devices 125, a relay 142, a recording device 138, and on-site alert devices—such as, an external strobe light 146 and/or an external siren 144.

Surveillance devices shown generally as 125 include at least one camera 126, one or more pan tilt zoom camera 128 and any other peripheral 130 having network connectivity (i.e. an Ethernet port).

The method of video surveillance with a mobile station using cellular communication 50 includes the following steps:

Power is applied to the mobile station 100. The mobile station 100 can be powered by the power grid alone, in part by solar power with the power grid supplying the necessary residual power, or fully by solar power.

Mobile station 100, having received power, transmits wireless surveillance data 112 to the monitoring center 114 and receives control data 102 from the monitoring center 114 via the cellular network 106 and the mobile internet 110 using the private APN 108.

Figure 3:
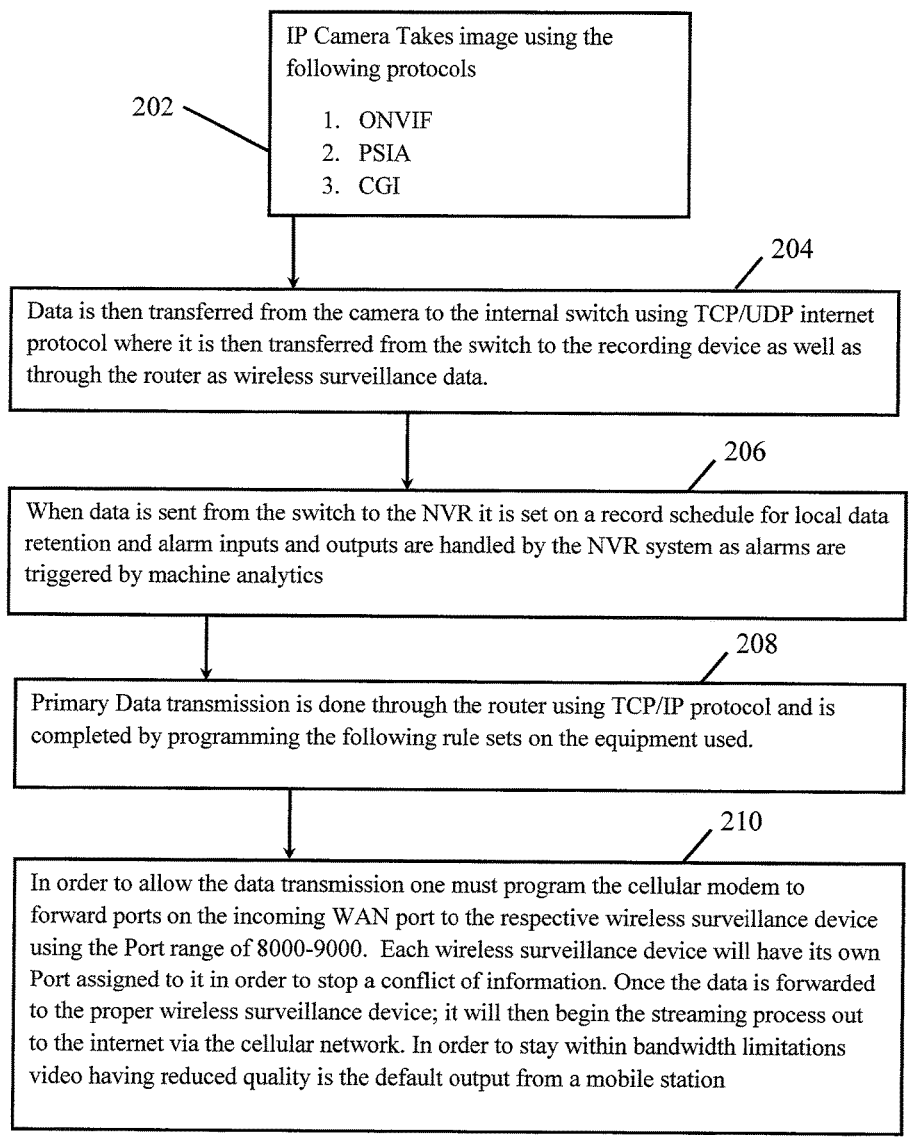
FIG. 3 is a flow diagram showing the flow of wireless surveillance data from a surveillance device (a camera) to a router within the method of video surveillance using cellular communication.
Figure 4:
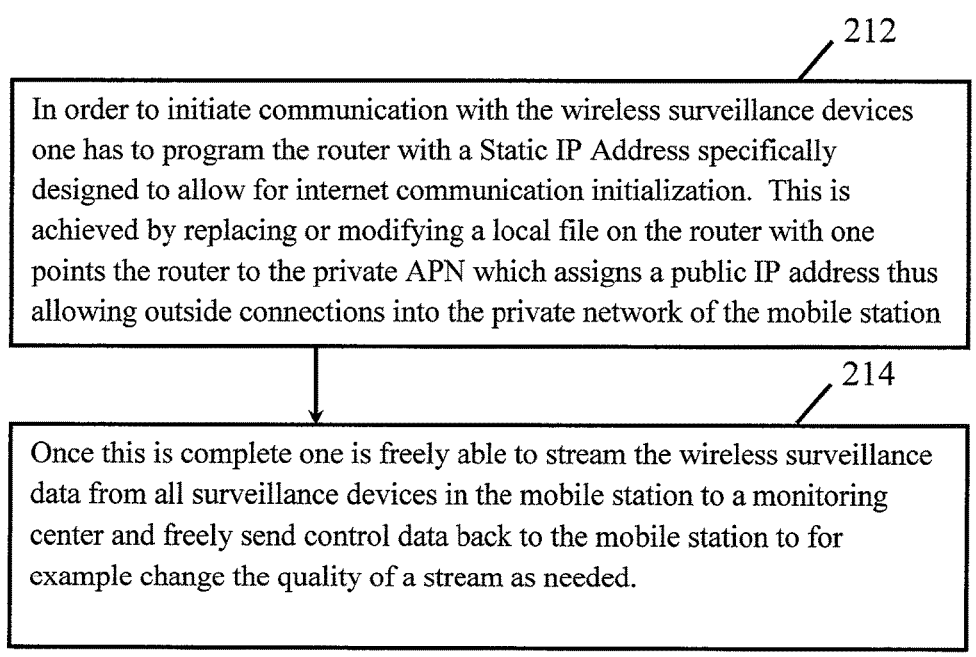
FIG. 4 is a flow diagram showing the configuration of the mobile station to output outgoing wireless surveillance data and accept incoming control data.

Referring to FIGS. 1 to 3, Wireless surveillance data 112 includes a selectable stream of high quality or reduced quality video, and an analytic stream corresponding to triggered exceptions to analytic parameters; specifically, a line crossing, a region encroachment, an object removal, and/or a facial recognition.

The selectable video stream is further described in FIG. 3 at 202, as consisting of images taken by a surveillance device 126 using the following protocols: ONVIF, PSIA and CGI.

The analytic stream can be expanded to also include statistical information; namely, object recognition, facial recognition, line crossing frequency, region enter and exit, object removal, person counting, traffic statistics and time lapse photography depending on the application and requirements of the client.

Control data 102 includes commands to vary resolution of video transmitted to monitoring center, pan or tilt camera, trigger an audible alarm, trigger a light, initiate two way voice messaging, and adjust predetermined analytical parameters.

Communication between mobile station 100 and monitoring center 114 is specifically accomplished by configuring and using the cellular network 106 and the private network 105.

Beginning with the configuration and use of the cellular network 106, each mobile station 100 having a phone number and cellular signal can access the cellular network 106.

The router 140 is programmed to communicate with the private APN 108 using the cellular network 106 and is assigned a public IP address thereby establishing an internet connection. This process is further described in FIG. 4 at 212.

The private APN 108 is configured to allow unrestricted flow of data; namely, no data throttling and no blocked ports. Further, the private APN 108 allows the router 140 to minimize packet loss by resetting the time to live for each data packet leaving the router to the maximum value.

The private network 105 is created when pre-programmed software in the NVR 132 configures the surveillance devices 125 attached to the internal switch 134 such that each surveillance device 125 is assigned a private IP address and a preselected identifying port address based on the characteristics of that particular device as determined by its MAC address.

The process of establishing the private network is further illustrated in FIG. 3 which describes the range of ports to be use at 210; namely, a range of 8000-9000. Additionally FIG. 3 at 206 shows that alarm inputs and machine monitoring using preselected analytic parameters are easily used within this method without the interaction of the monitoring center 114.

The surveillance devices 125 transmits data to the router 140, for output as wireless surveillance data 112, and to the recording device 138, for internal storage of high quality video, through communication with the private network— specifically, the NVR 132 via the internal switch 134 and software.

This configuration allows the surveillance devices 125 to send and receive data to and from the router 140. The router has a public IP address and sends and receives data using the mobile internet 110 to and from each of the surveillance devices 125.

Wireless surveillance data 112 transmitted from the mobile station 100 over the cellular network 106 and mobile internet 110 via the APN 108 is received by a monitoring center 114 for internal monitoring and further output to client stations 120 on demand.

The default transmission quality of wireless surveillance data 112 over the cellular network 106 is typically reduced quality—configured such that less than 10 gigabytes of data are consumed for 432 hours of surveillance time with three surveillance devices 125 (namely, two cameras 126 and one pan tilt zoom camera 128) operating continuously.

Figure 5:
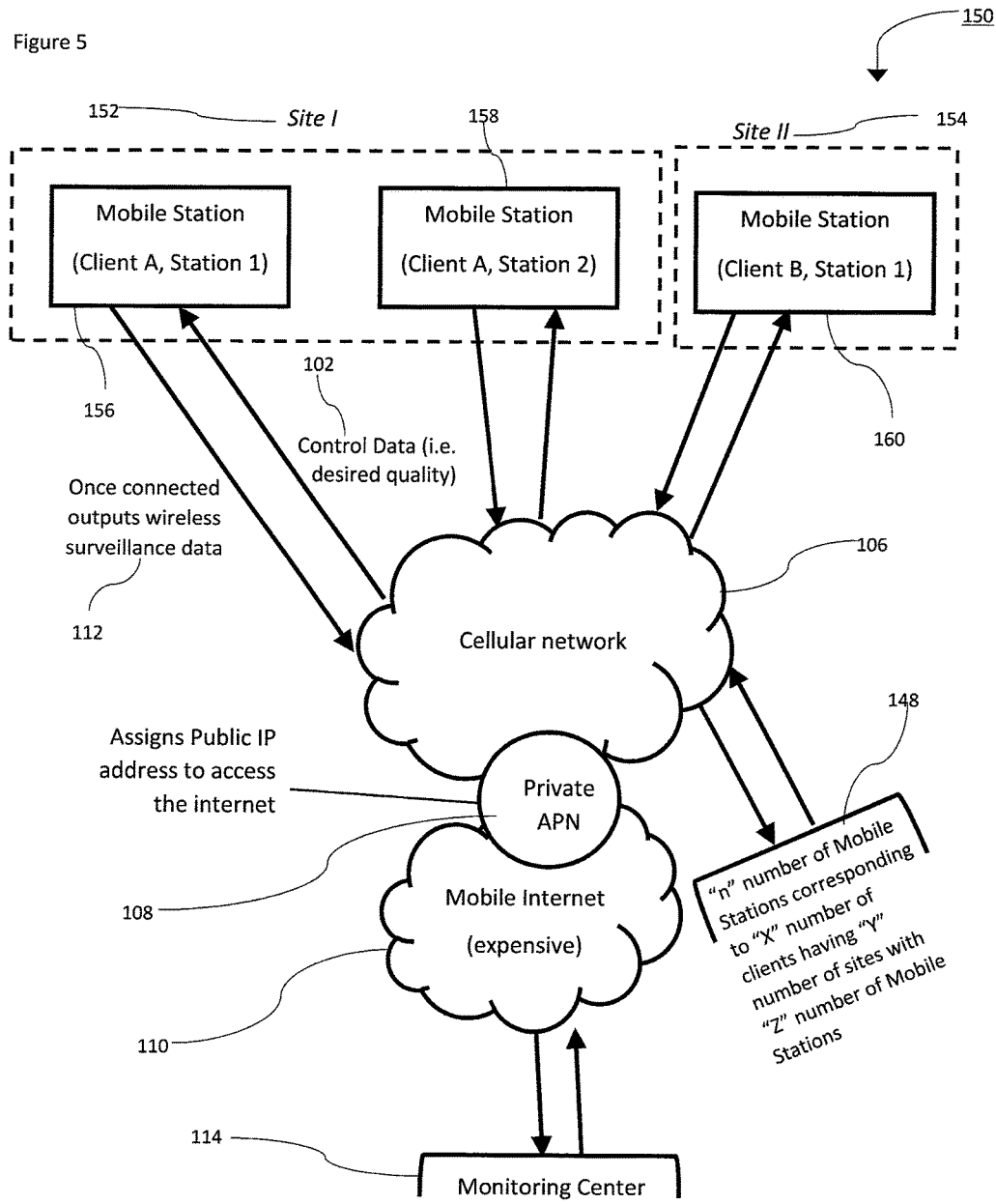
FIG. 5 is a flow diagram showing a multiple mobile stations belonging to different clients at different sites interacting with the Monitoring center where the mobile stations are to be grouped and compiled for output.

FIG. 1 and FIG. 5 illustrate the on demand output of wireless surveillance data streams 116 to the client stations 120. The monitoring center 114 receives wireless surveillance data 112 from multiple mobile stations 100 and compiles wireless surveillance data 112 for output to client stations 120. More specifically, wireless surveillance data 112 from each mobile station 100 is associated with a certain site 150, which is further associated with a client. Wireless surveillance data 112 from all of the client's sites 150 are stored into a client's data file on cloud storage 117 for subsequent on demand output to the client.

By way of example FIG. 5 shows two clients, Client A and Client B, having three mobile stations 100; namely, Client A Station One 156, Client A Station Two 158 and Client B Station One 160. Each mobile station 100 transmits wireless surveillance data 112 and exists on a certain site 150; namely, Site I 152, or Site II 154. The monitoring center 114, in this example, receive the wireless surveillance data 112 from Client A Station One 156 and Client A Station Two 158 and compile both in Client A's data file under Site I 152. Similarly, the monitoring center 114 would receive the wireless surveillance data from Client B Station One 160 and store it in Client B's data file under Site II 154. Client B's site I is not shown in FIG. 5; however, it would similarly be stored in Client B's data file though separate from Site II 154.

The compiling process accommodates "N" number of mobile stations 100 which is the product of "X" number of clients, "Y" number of sites 150 having "Z" number of mobile stations 100.

By way of example, eight (8) clients, each having two (2) sites with three (3) mobile stations 100 means the monitoring center 114 is in communication with forty-eight (48) mobile stations 100. Each client will have a data file divided into two (2) sites each having wireless surveillance data 112 from the three (3) mobile stations 100 on each site.

On demand output of wireless surveillance data 112 to client stations 120 is served from a single source; namely, cloud storage 117 within the monitoring center 114. Therefore, duplicate requests for wireless surveillance data; namely, requests for wireless surveillance data that has already been transmitted from a mobile station 100 to the monitoring center 114, will solely be transferred from the client's data file stored on cloud storage 117 to the client stations 120 over less expensive wired internet 115.

On demand output of wireless surveillance data 112 is in the form of a number of wireless surveillance streams 116 corresponding to the number of clients requesting data.

This concept is illustrated further by the following three examples.

In the first example, referring to the client stations 120 from FIG. 1, Client A could be requesting reduced quality wireless surveillance data 112 from two client stations 120; namely, a mobile app 122 and a desktop computer 124. The requested wireless surveillance data 112 has typically already been transmitted from the mobile station 100 to the monitoring center 114, as the transmission quality is by default reduced quality in order to conserve bandwidth over the mobile internet 110. Therefore, Client A's requests are both for duplicate data and both requests would be served from the cloud storage 117 with no additional data transfer over the mobile internet 108.

Modifying the example, but again referring to the client stations 120 from FIG. 1, Client A could be requesting high quality wireless surveillance data 112 from two client stations; namely, a mobile app 122 and a desktop computer 124. The requested high quality wireless surveillance data 112 will typically not have been previously transmitted from the mobile station 100 to the monitoring center 114, as the default transmission quality is reduced quality. As such, the monitoring center 114 sends control data 102 back to the mobile station 100 to transmit the requested wireless surveillance data 112 in high quality format. The requested wireless surveillance data can either be live or historic. Having transmitted the requested high quality wireless surveillance data 112 to the monitoring center 114, the requests from the client stations 120 are both for duplicate data and both requests would be served from the cloud storage 117 with a single data transfer over the mobile internet 108.

Again modifying the example, and referring to the client stations 120 from FIG. 1, Client A could be requesting high quality wireless surveillance data 112 from a mobile app 122 at a time "$t_1$" and a desktop computer 124 at a time "$t_2$" two weeks from the original time "$t_1$". At "$t_1$" the requested high quality wireless surveillance data 112 will typically not have been transmitted from the mobile station 100 to the monitoring center 114, as the default transmission quality is reduced quality. As such, the monitoring center 114 sends control data 102 back to the mobile station 100 to transmit the requested wireless surveillance data 112 in high quality format. The requested wireless surveillance data can either be live or historic. Having transmitted the requested high quality wireless surveillance data 112 to the monitoring center 114, the request from the mobile app 122 is served from the cloud storage 117 with a single data transfer over the mobile internet 108. At "$t_2$", the requested wireless surveillance data 112 is duplicate data, having been previously transmitted to the monitoring center 114 and stored in cloud storage 117 at "$t_1$"; therefore, this later request would be served from the cloud storage 117 with no additional data transfer over the mobile internet 108.

The cloud storage 117 can serve multiple client stations 120 belonging to different clients—for example, Client B's client stations 121 and Client A's stations; namely, the mobile app 122 and desktop computer 124.

Alternate Embodiment

Figure 6:
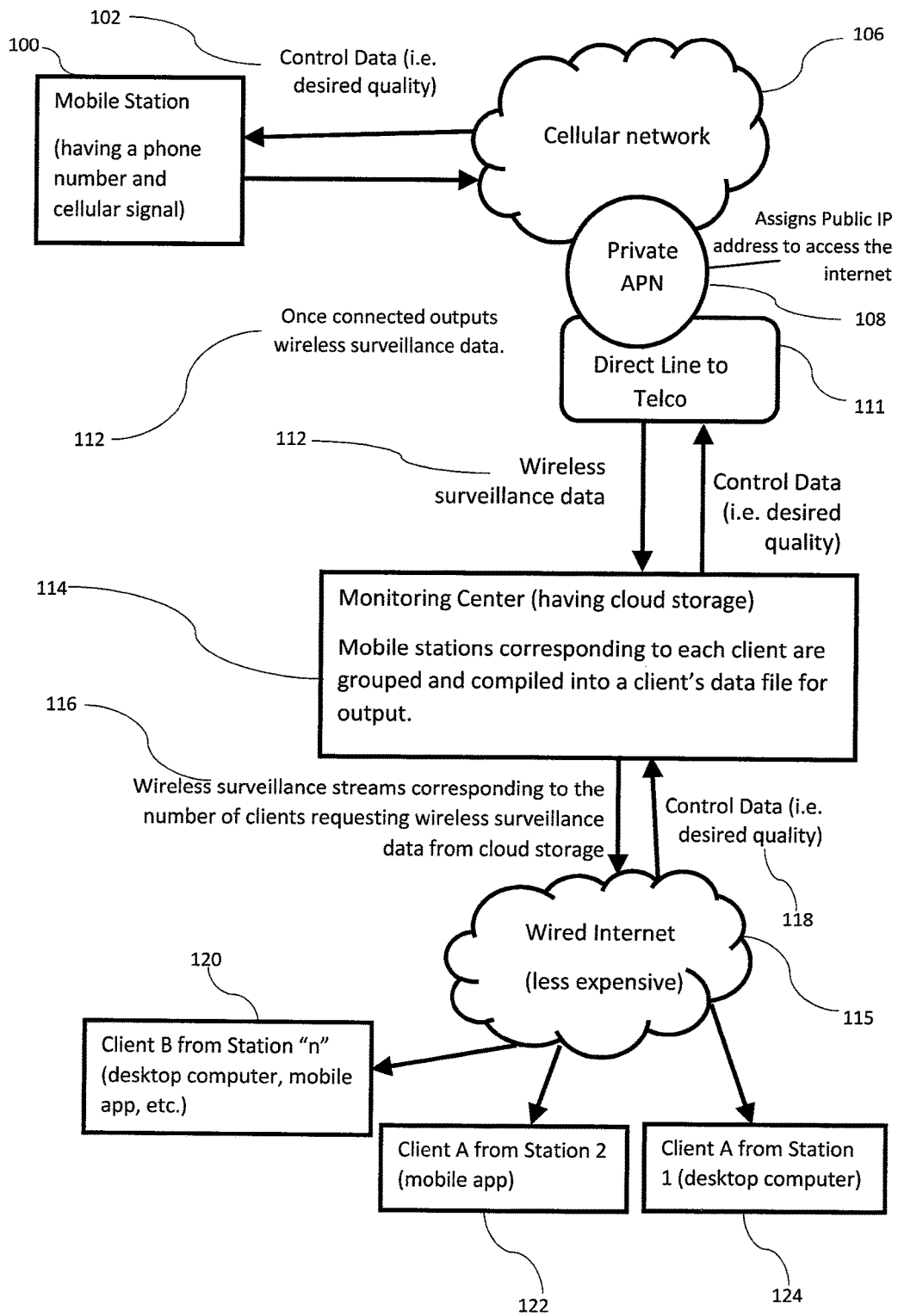
FIG. 6 is a flow diagram showing an alternate embodiment of the method of video surveillance using cellular communication where mobile internet is replaced by a direct wired connection between the monitoring center and the cellular network provider.

Referring to FIG. 6, in contrast to FIG. 1, it is apparent that the mobile internet 110 can be substituted for a direct connection to the cellular service provider 111.

Wireless surveillance data 112 is still transmitted over the cellular network 106 via the private APN 108; however, a direct connection 111 avoids the high variable cost of mobile internet in favour of a fixed fee with lower variable costs. This alternative embodiment is preferably once the number of mobile stations 100 crosses a break even threshold such that the direct line is less expensive.

A number of wireless surveillance data streams 116 are still outputted over the internet 115 to the client stations 120.

I claim:

1. A mobile station for video surveillance using cellular communication with a monitoring center, wherein inside or attached to the mobile station, the mobile station comprises:
   a. a router having a wireless transceiver for transmitting data wirelessly and having a public static IP address, the router configured for communication with the monitoring center via a private Access Point Network (APN) of a cellular network and via the mobile Internet, wherein the APN is configured to allow unrestricted flow of data with the router including no data throttling, and no blocked ports, wherein the router is configured to instruct the APN to reset a time to live for each data packet received from the router;
   b. a Network Video Recorder (NVR) that includes a processor and has a respective private IP address;
   c. a plurality of surveillance devices;
   d. the processor of the NVR configured for communicating with the surveillance devices and defining a private network that is internal to the mobile station by assigning a respective private IP address to each of the surveillance devices and assigning a respective port address of the router corresponding to the private IP address of each surveillance device, and the respective private IP address of the respective surveillance device is unknown to the monitoring center; and
   e. an internal storage;
   f. wherein the surveillance devices are configured for sending, through the router and through the private APN, wireless surveillance data from the surveillance devices to the monitoring center, the surveillance devices are configured for communication with the private IP address of the NVR of the mobile station and the NVR stores surveillance data to the internal storage, and at least one of the surveillance devices are configured for receiving control data wirelessly from the monitoring center, through the public IP address and the respective port address of the router, and the router is configured to route the control data to the private IP address of the respective surveillance device, for the at least one of the surveillance devices to implement one or more commands from the control data;
      wherein one or more commands of the control data include adjusting predetermined analytical parameters;
      wherein the mobile station is configured to monitor and record analytic data which is based on the predetermined analytical parameters which trigger an exception, the exception is one or more of a line crossing, an object removal, or a facial recognition, and wherein the mobile station is configured to determine, without interaction of the monitoring center, the exception by machine analytics applied to video imaging and in response to the exception:
      send the analytic data of the exception to the monitoring center, and trigger an alarm.

2. The station of claim 1 wherein the monitoring center is configured to receive video from multiple mobile stations, including the mobile station, each for monitoring a respective site, and is configured to compile data from each of the multiple mobile stations, wherein all of the sites are associated with a client and data from all of the client's sites are stored into a client's data file for subsequent on demand output to the client.

3. The mobile station of claim 2 wherein the NVR is further configured for communicating between the router and the surveillance devices.

4. The mobile station of claim 2 wherein a client's request for duplicate wireless surveillance data is served by the monitoring center from the client's data file.

5. The mobile station of claim 1 wherein the NVR is further configured for communicating between the surveillance devices, wherein each of the surveillance devices include a respective Media Access Control (MAC) address, wherein the assigning of the respective port address is identified by the processor NVR with the respective MAC address and the respective private IP address of the respective surveillance device.

6. The mobile station of claim 1 wherein the surveillance devices are one or more video cameras or Pan Zoom Tilt Cameras (PZTs).

7. The mobile station of claim 1 wherein one or more further commands of the control data include one or more of: vary resolution of video transmitted to monitoring center, or pan or tilt camera.

8. The mobile station of claim 1 wherein the mobile station records statistical information from the analytic data.

9. The mobile station of claim 1 wherein the mobile station is solar powered.

10. The mobile station of claim 1 wherein the exception further comprises a region encroachment.

11. The mobile station of claim 1 wherein the processor configures data transmission of the wireless surveillance data over the cellular network such that less than 10 gigabytes of data are consumed for 432 hours of surveillance time with three video cameras continuously operating.

12. The mobile station of claim 1 wherein data from the surveillance devices is transmitted to the NVR and recorded and stored onto the internal storage at a highest resolution possible.

13. The mobile station of claim 1 wherein data from the surveillance devices is stored internally by the NVR at a highest resolution possible and transmitted via the router over the cellular network at reduced resolution as compared to the highest resolution possible.

14. The mobile station of claim 1 wherein the surveillance devices include one or more IP cameras that collect video images using one or more of the following protocols: open network video interface forum (ONVIF), Physical Security Interoperability Alliance (PSIA) or Computer Graphics Interface (CGI).

15. The mobile station of claim 1 wherein the mobile station includes further devices that are assigned the respective private IP address by the processor, the further devices being one or more of lights or sounding devices.

16. The mobile station of claim 15 wherein the one or more further devices are configured for receiving the control data wirelessly from the monitoring center, through the router, for the one or more further devices to implement one or more further commands from the control data, wherein the one or more further commands of the control data include one or more of: trigger an triggered alarm is an audible alarm, or trigger a light, or initiate two way voice messaging.

* * * * *